Feb. 26, 1924.
E. E. WEMP
1,485,319
CLUTCH
Filed May 19, 1921   3 Sheets-Sheet 1
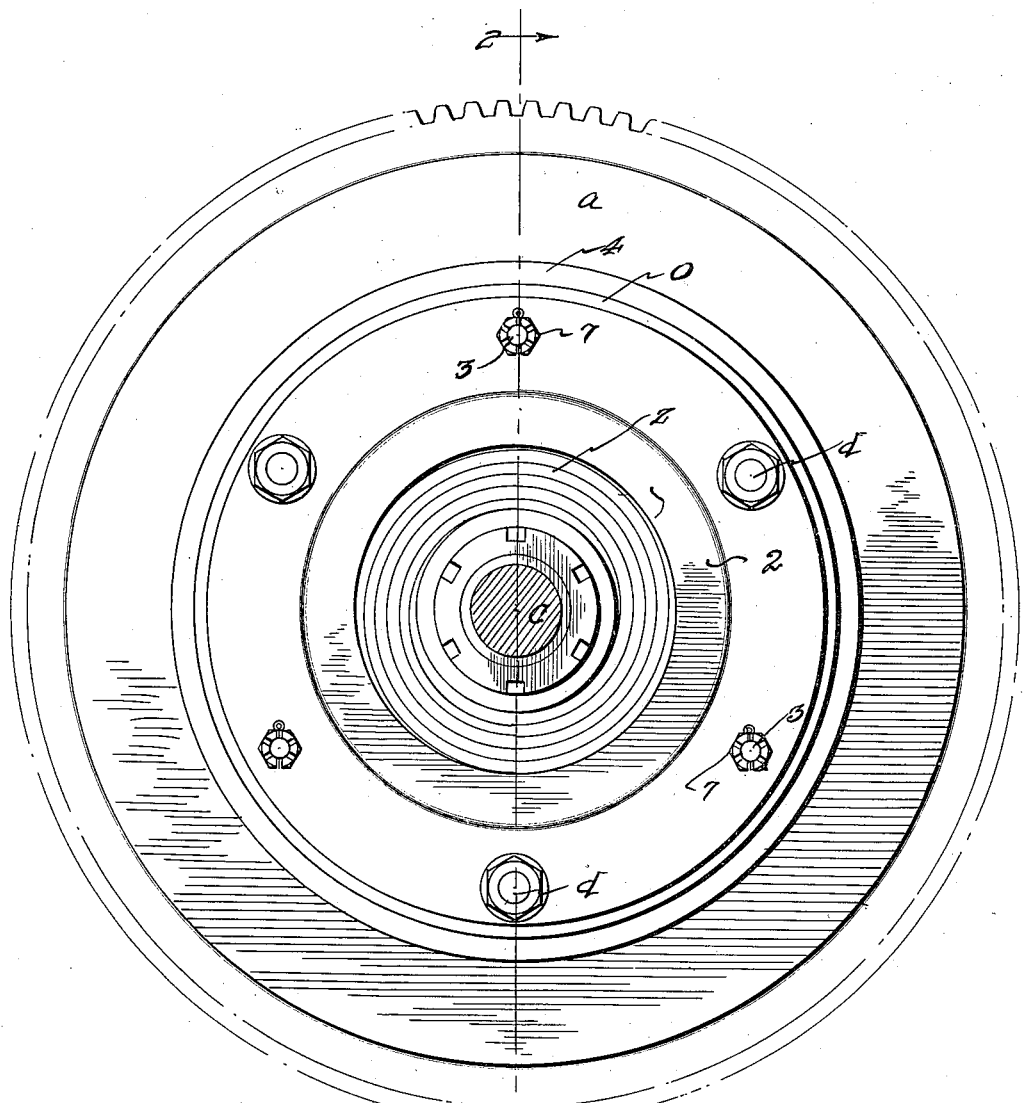
Fig. 1
INVENTOR.
Ernest E. Wemp
BY
Stuart C. Barnes
ATTORNEY.

Feb. 26, 1924.

E. E. WEMP 1,485,319

CLUTCH

Filed May 19, 1921  3 Sheets-Sheet 2

INVENTOR.
Ernest E. Wemp
BY Stuart C. Barnes
ATTORNEY.

Feb. 26, 1924.
E. E. WEMP
CLUTCH
Filed May 19, 1921
1,485,319
3 Sheets-Sheet 3
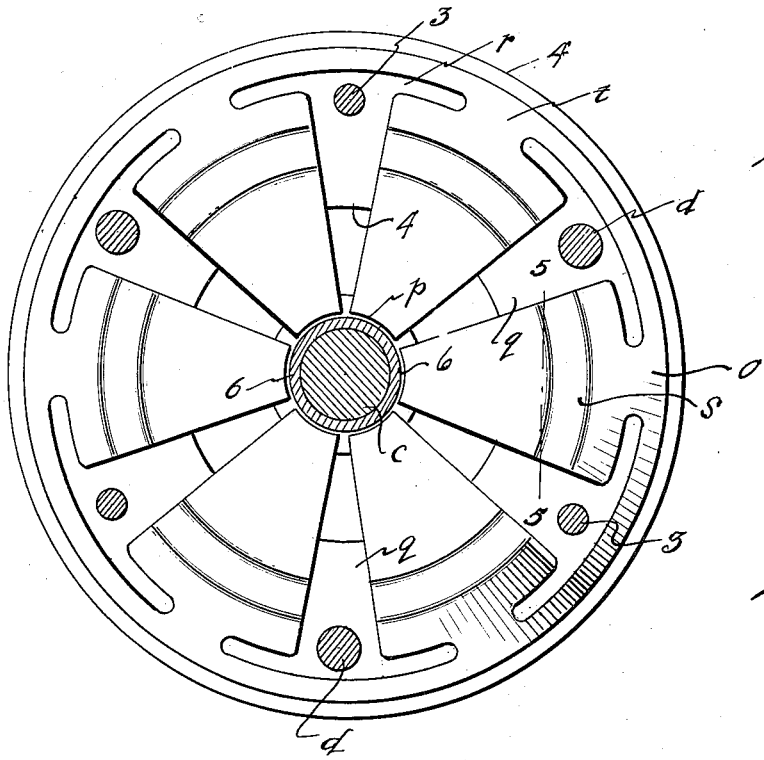
Fig. 3
Fig. 5
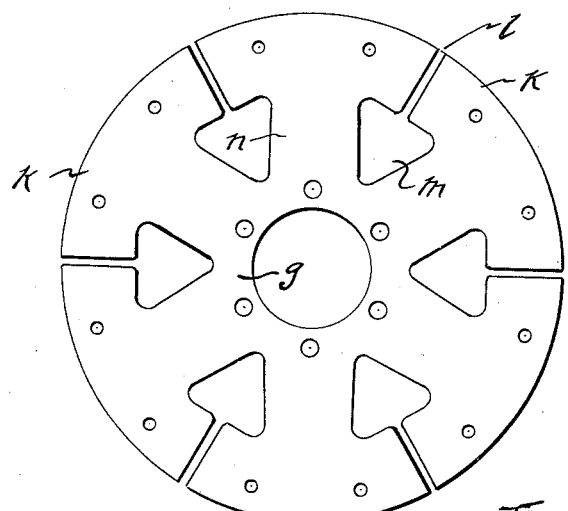
Fig. 4
INVENTOR.
Ernest E. Wemp
BY
Stuart C. Barnes
ATTORNEY.

Patented Feb. 26, 1924.

1,485,319

UNITED STATES PATENT OFFICE.

ERNEST E. WEMP, OF DETROIT, MICHIGAN.

CLUTCH.

REISSUED

Application filed May 19, 1921. Serial No. 470,851.

*To all whom it may concern:*

Be it known that I, ERNEST E. WEMP, a citizen of the United States, residing at Detroit, in the county of Wayne and State of Michigan, have invented certain new and useful Improvements in Clutches, of which the following is a specification.

This invention relates to clutches of the multiple disk type. It has for its object an improved clutch provided with a number of features which make for improved clutch action and economy in manufacture.

Among these features is an arrangement of self-spacing and positioning disks. These disks are so constructed that they are locally flexible in sections around the periphery, thereby making the clutch self-adaptable to variations and misalignment of the driving and driven shafts.

The clutch is designed to quickly dissipate the heat that is generated in the disks and which in a great many clutches causes the deterioration of the disk facings, especially in the center disks.

The pressure member or disk packing member is an entirely novel construction and very economical to manufacture. It is a simple stamping from a single sheet of material and eliminates the necessity of separate levers and pins that are used in other clutches of this type. The lever parts of this disk fulcrum on a yieldable abutment which gives the clutch a very gentle and smooth action in taking hold as distinguished from the grabbing action found in many clutches.

The clutch spring, clutch thrust collar, clutch spring housing, pressure disk, yieldable abutment and one of the driving disks are all tied together in a single assembly by bolts and springs which permits the parts to be easily handled and prevents the driving disk from rapping against the pressure disk when disengaged.

These and other features will be explained in detail as the parts are specifically described.

In the drawings,—

Fig. 1 is an elevation of the clutch looking forward along the driven shaft.

Fig. 3 is a section on the line 3—3 of Fig. 2.

Fig. 4 is a detail of one of the self-spacing and locally-flexible driven disks.

Fig. 5 is a section on the line 5—5 of Fig. 3.

Figure 2:
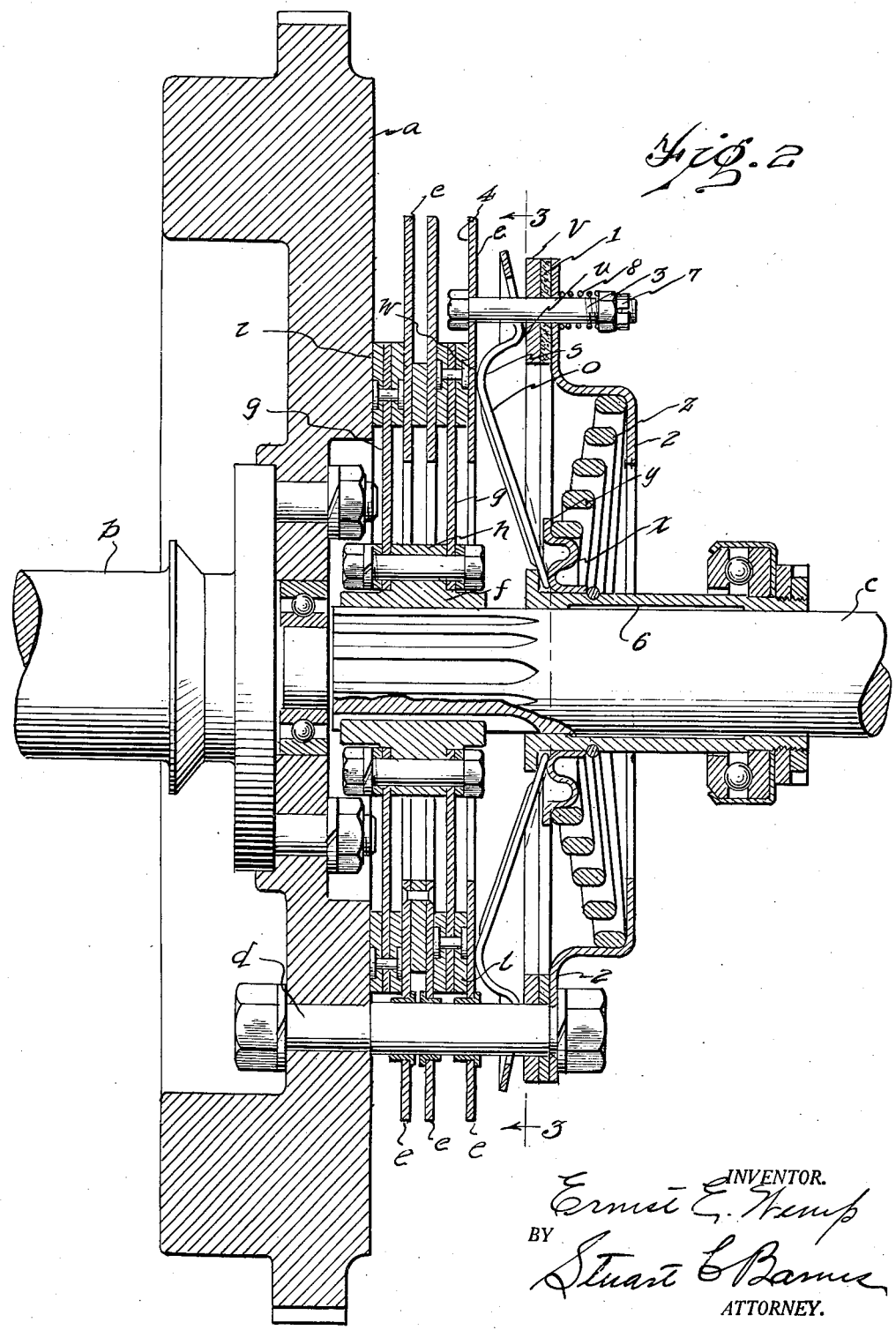
Fig. 2 is a longitudinal section of the same on the line 2—2 of Fig. 1.

The fly wheel is designated $a$ and is bolted to the crankshaft $b$ which is supposed to be in accurate alignment with the driven or clutch shaft $c$. A plurality of studs $d$ are secured to the fly wheel and on these are slidably secured the driving disks $e$ which are preferably of metal. There are three of these driving disks, but of course the number of them might be varied. $f$ indicates a splined sleeve which is splined on to the end of the driven or clutch shaft $c$. A pair of driven disks $g$ are bolted one to each end of the collar portion $h$ of this splined sleeve. Each one of these driven disks has on its two opposite sides a clutch facing $i$ of suitable composition material containing asbestos or other heat-resisting material.

It will be noticed that the adjacent face of the fly wheel acts as one of the clutch faces of this clutch. One driven disk engages between this fly wheel face and a pair of driving disks which are permanently fastened together and spaced. The other driven disk engages between this latter set of driving disks and the rear driving disk 4. One of the great fauts in multiple disk clutches is that the center disks deteriorate due to the excessive heat developed and the lack of facility for dissipation of this heat. The disk facings are impregnated with a material that becomes fluid when a high temperature is developed and this oozes out of the facing and collects on the opposite metal disk. When the heat has abated it hardens and forms an abrasive which cuts into the opposite clutch facing and tears it. The design and arrangement of clutch disks that I have just described obviates this trouble. In the first place, the driving disks or rings are of considerably larger diameter than the driven disks, thereby providing widely-spaced fins at the periphery of these driving disks which act as cooling fins due to the fact that they are rotated at high velocity in a position where the air may strike them and cool the same. By using a pair of disks at the center of the driving disks and spacing this pair of disks obviously this pair of disks, which would ordinarily get the hottest, is well equipped to dissipate the heat for it not only has only a single face of each disk exposed to the friction of the driven disks but there is an air cooling space left between the two disks. Obviously the fly wheel and the rear driving disk are well equipped to carry away the heat as they meet friction only on one face and are free on one side to be cooled by the air.

The driven disks are one of the novel features of this clutch. Instead of being made up as solid disks they are divided into segments $k$ by the slots $l$ (Fig. 4) which are narrow along the outer zone of the disk but are relatively wide at the middle zone of the disk forming triangular slots $m$. This leaves relatively flexible neck portions $n$ connecting the outer portions of the segments so as to make the segments very flexible. These disks are constructed of spring steel. This flexible segment construction makes the disk locally flexible in sections, which accomplishes a very important function in the action of the clutch. Very often the crankshaft is not in true alignment with the driven shaft. This is due to errors in machining or to the taking up of the bearings on the crankshaft. This obviously throws the fly wheel face out of a true position of parallelism with the driven disks and also throws the driving disks out of parallelism with the driven disks. The consequence is that the driven disks tend to bear more heavily at one side of the shaft than at the other. This, of course, does not result in efficient clutch action and also tends to wear the splines on the clutch shaft. This difficulty is obviated by my construction in which the driven disks are divided into numerous segments which makes them locally flexible. The consequence is, one set of disks being flexible, obviously no ordinary misalignment of the shafts will make any difference in the clutch operation as the clutch disks in packing can adapt themselves to this lack of parallelism. Furthermore, when the clutch disks in the ordinary clutch are released there is no means of properly spacing and positioning them so that they do not drag on one another. In my construction, the driven disks being constructed as they are of spring steel and flexible along their outer zone, obviously they can easily separate from the other set of disks and assume their ordinary position when the pressure upon the disks is released for each of these driven disks is permanently spaced where they are fastened to the splined sleeve $f$. The driven disks at their peripheries, when not under pressure, are spaced from each other a distance greater than the width of the permanently-spaced driving disks $e$. The flexible neck portion $n$ formed by the triangular slot $m$ forms what I call a "spoked" flexible clutch disc. These spokes terminate in enlarged clutch-facing-carrying segments $k$ to which is riveted a clutch facing material $i$. This construction is important. With straight radial slots the flexing and bending line of the segment will be at the ends of the slots at the narrowest point of the converging segment hence all the bending strains will be constantly in this line and the result is that the metal will soon crystallize and break. This is a familiar action with flat springs where there is a hinging action always along a single line. With the enlarged slots $m$ a relatively long neck portion or spoke of substantially uniform cross section is afforded and consequently the fiber stresses are distributed along the entire length of the spoke making not only for an easier flexing action, but distributing the bending strains along the entire spoke length and insuring the permanent life of the segment.

Furthermore, I find that by actual observance and experiment that a disc construction with enlarged slots to form spokes is not only flexible in a direction transverse to the plane of the disc, but the segments are capable of limited flexing action in the plane of the disc notwithstanding what appears to be a considerable cross section in this direction. This has a very useful function in connection with absorbing inertia and differential forces existing in the driving and driven parts. With ordinary clutches not capable of yielding in the direction indicated, these forces result in a chattering action which is entirely eliminated with my clutch.

Pressure is applied to the clutch disks to pack them by what I believe to be an entirely novel method, namely, the packing or pressure member $o$. This is detailed in Fig. 3. The disk is made up of a center perforation with a plurality of T-shaped slots extending radially outward but short of the periphery. This disk is provided with a deep annular corrugation $s$ near the periphery. The center of the disk is pressed rearwardly, as is evident from Fig. 2, making this portion conical. The disk is made of spring steel and is a stamping. The disk is formed after having been heated and is tempered by being quenched in oil when held firmly between two dies to prevent any distortion. The material between the two slots of this disk forms a lever which has a convexo-concave section—see section 5—5 of Fig. 3. This convexo-concave construction prevents the segments or levers flexing and brings the hinging line of the same in the neck portion $t$ of the levers or segments at the point or line $u$ (Fig. 2) where the disk abuts against the metal abutment ring $v$. This is also the fulcrum point of the lever. The resistance point is at $w$ or where the annular corrugation abuts against the rear driving disk 4. The point of application of the power is at $x$ where the thrust collar $y$ of the clutch spring $z$ engages the end of the lever or the apex of the segments.

This makes the segments or levers levers of the second order. The drawing shows substantially five to one ratio of length of power arm to resistance arm. This enables a less force traveling through a greater distance to operate to pack the disks than would be the case if the thrust were a direct one without any advantage of levers. Of course, this broad operation is not new. However, I do believe that the design of this pressure element, whereby a single stamping provides not only the packing ring but the levers, is new and obviously it results in very much cheaper construction.

Furthermore, each one of these segments or levers provides a local thrust to the disks and each segment or lever fulcrums on an abutment ring v which is cushioned by the slow action yielding cushion 1 placed between the abutment ring v and the clutch spring housing 2. This cushion is preferably a cork ring. This gives a clutch action which is very smooth and no grabbing or jerking occurs.

It will be noticed that the bolts 3 secure the rear driving disk 4 (which is referred to in the claims as a thrust ring), the pressure disk o, the abutment ring v, the cork ring 1, the clutch spring abutment 2, the clutch spring z, the thrust collar y and the clutch-shifting sleeve 6, together. Interposed between the castellated nuts 7 on the outer ends of the bolts and the clutch housing are coiled spacing springs 8. The bolts, nuts and springs secure all these members together as a unit. This makes a convenient assembly with the clutch spring z under compression. This assembly can be mounted as a unit on the driven shaft and then bolted to the fly wheel by the driving studs d. Furthermore, the springs 8 hold the rear metal driving disk 4 in yielding contact with the pressure disk so as to prevent any vibration or rapping between the two.

In some of the claims the fly wheel is made an element of the claim. It is to be understood that the fly wheel is here used in the sense of a large driving member, and that any member which would perform the same function in the combination claimed is considered an equivalent.

What I claim is:

1. In a clutch of the type described, a plurality of disks, some of which are slotted from the periphery inward and radially with slots enlarging toward the center to provide flexible spoked spring segments which permit the disk to be locally flexed and returned to its normal position when the pressure is released.

2. In a clutch of the type described, the combination of a fly wheel provided with a clutch face, a rear driving disk, a pair of driven disks provided with clutch facings on each side, one of the facings engaging the face of the fly wheel and another the front face of the rear driving disk, and a pair of driving disks spaced but united and engaging between the remaining clutch facings of the two driven clutch disks.

3. In a clutch of the type described, a set of clutch disks provided with clutch facings, and a second set of clutch disks some of which are united but spaced and are provided with outwardly-extending portions beyond the other set of clutch disks for the purpose of providing air-cooling fins.

4. In a clutch of the type described, a plurality of discs some of which are "spoked" discs having at the outer ends of the spokes enlarged facing-carrying segments.

5. In a clutch of the type described, the combination of a plurality of disks, a clutch spring, and means for transmitting thrust comprising a flexing integral disk having a convexo-concaved annular portion which acts as a load-receiving portion, and a conical interior portion which acts as the power-receiving portion.

6. In a clutch of the type described, the combination of a plurality of disks, a clutch spring, and means for transmitting thrust in connection with said disks, comprising an integral disk having an annular convexo-concaved portion acting as the load-receiving portion and a conical interior portion acting as the power-receiving portion, and an abutment which the outer portion of the disk engages against to fulcrum in the flexing of the disk parts.

7. In a clutch of the type described, the combination of a plurality of disks, a clutch spring, and means for transmitting thrust in connection with said disks, said means comprising an integral disk made up of a plurality of flexing segments having convexo-concaved portions adapted to act as the load-receiving portions, the inner ends of said segments acting as power-receiving portions, and an abutment against which the outer ends of the segments engage to fulcrum.

8. In a clutch of the type described, a plurality of disks, a clutch spring, means for transmitting thrust in connection with said disks, comprising an integral disk formed with an annular convexo-concaved portion, and a conical interior portion and divided into flexing segments by slots, and an abutment against which the outer portion of the disk engages to fulcrum while the convexo-concaved portion acts as the load-receiving portion and the interior portion acts as the power application portion.

9. In a clutch of the type described, the combination of a plurality of disks, a clutch spring, and a disk formed into a conical but perforated interior portion and a plurality of segments extending from the perforated center outward and each segment having a convexo-concaved cross section, said disk having a convexo-concaved annular portion acting as the load-receiving portion while the outer portion of the disk acts as a fulcrum and the inner ends of the segments act as the powder application points.

10. In a clutch of the type described, the combination of a plurality of disks, a clutch spring, and a pressure disk comprising a stamping having slots extending outwardly from a center perforation and formed near the periphery with an annular convexo-concaved portion adapted to abut against the said plurality of disks while the outer zone of the disk acts as a fulcrum, the interior of the disk being conical and arranged to take the thrust of the clutch spring, and a yieldable abutment for the fulcrum portion of the disk.

11. In a clutch of the type described, the combination of a plurality of disks, a clutch spring and a thrust member including a plurality of levers fulcrumed at their outer ends, and yieldable means upon which said levers fulcrum.

12. In a clutch of the type described, the combination of a plurality of disks, a clutch spring, and a pressure member for conveying the thrust of the clutch spring to the disks including a plurality of levers fulcruming at their outer ends, and a slow action cushion member for the said levers to fulcrum upon.

13. In a clutch of the type described, the combination of a plurality of disks, a clutch spring, and a pressure member for conveying the thrust of the clutch spring to the disks and including a plurality of levers of the second order, and a yieldable ring serving to cushion the fulcrum support for said levers.

14. In a clutch of the type described, the combination of a plurality of disks, a clutch spring, and means for conveying the thrust of the clutch spring to the disks including a plurality of levers, a metal ring on which the said levers fulcrum, and a ring of cork or similar material under the metal ring to provide a yieldable fulcrum for the said levers.

15. In a clutch, the combination of a fly wheel, a plurality of driving studs secured thereto, a plurality of driving disks slidably secured on said driving studs, a driven shaft, a sleeve splined on the end of the driven shaft, and a plurality of flexible radially slotted driven disks removably secured on said sleeve in permanently spaced relation with some of the driving discs between the driven discs, and means for exerting thrust to pack the disks.

16. In a clutch, the combination of a fly wheel, a plurality of driving studs secured to the fly wheel, a plurality of driving disks slidably secured on the studs, a driven shaft, a sleeve splined on the end of the driven shaft and provided with a collar portion, a pair of radially slotted flexible driven disks with a driving disk therebetween, bolts for removably securing the driven disks in permanently spaced relation on opposite sides of the collar portion of the sleeve, the said driven disks arranged to engage the driving disks when the disks are packed, and means for packing the disks.

17. In a clutch, the combination of a fly wheel, a plurality of driving studs secured to the fly wheel, a plurality of driving disks slidably secured on the studs, a driven shaft, a sleeve splined on the driven shaft, a plurality of flexible driven disks secured to the sleeve in permanently spaced relation, the outer portions of said disks having clutch facings arranged to engage between the several driving disks and also between one of the driving disks and the face of the fly wheel, and means for exerting spring pressure on the disks to pack them.

18. A clutch, having in combination a fly wheel, driving studs carried by the fly wheel, a plurality of driving and driven discs, and a clutch assembly unit cooperating with said discs but an independent assembly and removably secured to the ends of the driving studs, said unit including an abutment, thrust ring, and a thrust-producing means between the abutment and the thrust ring.

19. A clutch, having in combination, a fly wheel, a plurality of driving studs carried thereby, driving and driven discs, and a clutch assembly unit cooperating with said discs but an independent assembly removably secured on the ends of the driving studs, said unit including an abutment, thrust ring, clutch spring, and thrust-transmitting member.

20. A clutch, having in combination a fly wheel, a plurality of driving studs carried thereby, driving and driven discs, and a clutch assembly unit cooperating with the said discs but an independent assembly and removably secured on the ends of the driving studs, said unit including an abutment, a thrust ring, a spring and a thrust-transmitting member, and bolts and nuts for removably bolting these parts together as one assembly.

In testimony whereof I affix my signature.

ERNEST E. WEMP.